US011885322B2

(12) United States Patent
McKay

(10) Patent No.: US 11,885,322 B2
(45) Date of Patent: Jan. 30, 2024

(54) HEAT-DRIVEN PUMPING SYSTEM

(71) Applicant: ECONOMAD SOLUTIONS LTD, London (GB)

(72) Inventor: Peter McKay, Liverpool (GB)

(73) Assignee: ECONOMAD SOLUTIONS LTD., London (GB)

( * ) Notice: Subject to any disclaimer, the term of this patent is extended or adjusted under 35 U.S.C. 154(b) by 233 days.

(21) Appl. No.: 17/267,479

(22) PCT Filed: Aug. 9, 2019

(86) PCT No.: PCT/GB2019/052255
§ 371 (c)(1),
(2) Date: Feb. 9, 2021

(87) PCT Pub. No.: WO2020/030933
PCT Pub. Date: Feb. 13, 2020

(65) Prior Publication Data
US 2021/0310473 A1  Oct. 7, 2021

(30) Foreign Application Priority Data

Aug. 10, 2018  (GB) .................................... 1813090

(51) Int. Cl.
*F04B 43/00* (2006.01)
*F03G 6/00* (2006.01)
*F04B 17/00* (2006.01)

(52) U.S. Cl.
CPC ............ *F04B 43/0027* (2013.01); *F03G 6/00* (2013.01); *F04B 17/006* (2013.01); *Y02E 10/46* (2013.01)

(58) Field of Classification Search
CPC .......... F03G 6/00; F04B 17/006; F04B 43/10; Y02E 10/46; F04F 1/04
(Continued)

(56) References Cited

U.S. PATENT DOCUMENTS 2,688,923 A * 9/1954 Bonaventura ......... F04B 43/026
165/45
3,937,599 A * 2/1976 Thureau ................ F04B 17/006
417/389
(Continued)

FOREIGN PATENT DOCUMENTS

CN       101586546 B      10/2011
DE         3542865 A1      7/1986
(Continued)

OTHER PUBLICATIONS

Examination Report for GB1813090.6 dated Jan. 30, 2019, 7 pages.
International Search Report for PCT/GB19/52255 dated Oct. 25, 2019, 11 pages.

*Primary Examiner* — Kenneth J Hansen
*Assistant Examiner* — Benjamin Doyle
(74) *Attorney, Agent, or Firm* — Suiter Swantz pc llo

(57) ABSTRACT

According to examples of the disclosure there is provided a heat-driven pumping system and a method of pumping. The heat-driven pumping system comprises a closed circuit for a first liquid. The closed circuit comprises a vaporization portion. The vaporization portion is configured to receive heat from an external source. The vaporization portion is configured to cause vaporization of first liquid within the vaporization portion. Vaporization of first liquid within the vaporization portion thereby increases an amount of gas in the closed circuit. The closed circuit is sealed such that the increase in the amount of gas increases a pressure exerted on the first liquid. The heat-driven pumping system comprises a transfer means. The transfer means is configured to convert the pressure exerted on the first liquid into a pumping force. The pumping force is transferred to a pumping vessel for pumping a second liquid.

15 Claims, 5 Drawing Sheets

(58) Field of Classification Search
USPC .......................................................... 417/379
See application file for complete search history.

(56) References Cited

U.S. PATENT DOCUMENTS

| | | | | |
|---|---|---|---|---|
| 4,177,019 | A | * | 12/1979 | Chadwick ................. F03G 6/06 |
| | | | | 417/394 |
| 4,390,325 | A | | 6/1983 | Elo et al. |
| 4,409,961 | A | | 10/1983 | O'Hare |
| 4,427,350 | A | * | 1/1984 | O'Hare ................. F04B 17/006 |
| | | | | 417/379 |
| 4,898,519 | A | * | 2/1990 | Vanek ..................... F04B 43/10 |
| | | | | 60/478 |
| 5,114,318 | A | * | 5/1992 | Freeborn ................. F04B 17/00 |
| | | | | 60/641.9 |
| 8,353,684 | B2 | * | 1/2013 | Peacock .................. F04B 19/24 |
| | | | | 417/244 |

FOREIGN PATENT DOCUMENTS

| | | |
|---|---|---|
| GB | 2342958 B | 6/2002 |
| RU | 2418200 C1 | 5/2011 |
| RU | 2418993 C1 | 5/2011 |
| RU | 2432503 C1 | 10/2011 |
| WO | 9315317 A1 | 8/1993 |

\* cited by examiner

HEAT-DRIVEN PUMPING SYSTEM

CROSS REFERENCE TO RELATED APPLICATIONS

The present application is related to and claims benefit of the earliest available effective filing date from the following applications: The present application constitutes a National Phase application of PCT Application Number PCT/GB2019/052255, filed Aug. 9, 2019, which claims priority to Patent Application No. GB1813090.6, filed Aug. 10, 2018, whereby PCT Application Number PCT/GB2019/052255 and Application GB1813090.6 are incorporated herein by reference in their entirety.

TECHNOLOGICAL FIELD

Embodiments of the present disclosure relate to a heat-driven pumping system. Some embodiments relate to a solar radiation-driven pumping system. Some embodiments find application in pasteurization.

BACKGROUND

Pumps are used to move liquids from a source to a higher level, working against gravity. Some pumps make use of electricity, either from the grid, from batteries or from an associated generator in order to provide the required energy to move the liquid against gravity. Pumps driven by renewable energy sources are known. Examples include pumps which make use of energy generated by associated wind turbines or photovoltaic cells. It is an object of the present invention to provide a pump for autonomously pumping a liquid against gravity with or without the need for electricity.

BRIEF SUMMARY

According to various, but not necessarily all, embodiments there is provided examples of a heat-driven pumping system and a method of pumping as claimed in the appended claims.

According to various, but not necessarily all, embodiments there is provided a heat-driven pumping system. The heat-driven pumping system comprises a closed circuit for a first liquid. The closed circuit comprises a vaporization portion. The vaporization portion is configured to receive heat from an external source. The vaporization portion is configured to cause vaporization of first liquid within the vaporization portion. Vaporization of first liquid within the vaporization portion thereby increases an amount of gas in the closed circuit. The closed circuit is sealed such that the increase in the amount of gas increases a pressure exerted on the first liquid. The heat-driven pumping system comprises a transfer means. The transfer means is configured to convert the pressure exerted on the first liquid into a pumping force. The pumping force is transferred to a pumping vessel for pumping a second liquid.

According to various, but not necessarily all, embodiments there is provided a method of pumping a second liquid. The method comprises providing a closed circuit for a first liquid. The closed circuit comprising a vaporization portion. The method comprises vaporizing first liquid within the vaporization portion. The vaporization of the first liquid is caused by heat received from an external source at the vaporization portion. The vaporization of the first liquid increases an amount of gas in the closed circuit. Increasing the amount of gas in the closed circuit thereby causes an increase in a pressure exerted on the first liquid. The method comprises converting the pressure exerted on the first liquid into a pumping force. The method comprises transferring the pumping force to a pumping vessel for pumping a second liquid.

The following portion of this "Brief Summary" section, describes various features that may be features of any of the embodiments described in the foregoing portion of the "Brief Summary" section. The description of a function should additionally be considered to also disclose any means suitable for performing that function The closed circuit may have an expandable volume and the closed circuit may be configured to cause the volume to expand when pressure exerted on the first liquid by gas in the closed circuit increases.

The transfer means may be configured to provide a fixed relationship between a volume of the pumping vessel and the volume of the closed circuit.

The transfer means may be configured to cause the volume of the pumping vessel and the volume of the closed circuit to vary in antiphase.

In some, but not necessarily all, examples there is provided means for adjusting the fixed relationship between the volume of the pumping vessel and the volume of the closed circuit so as to preset a position of a head of the second liquid in a discharge system coupled to the pumping vessel.

The closed circuit further may comprise a first reservoir and a second reservoir.

The closed circuit may be configured to cause the first liquid to be displaced from the first reservoir into the second reservoir when pressure exerted on the first liquid by gas in the closed circuit increases.

The second reservoir may comprise a first interface with a first compressible chamber.

The first interface may be displaceable so as to cause compression of the first compressible chamber under pressure exerted by the first fluid in the second reservoir.

The transfer means may comprise the first interface.

The transfer means may comprise a second interface between a second compressible chamber and a third reservoir within the pumping vessel.

The second interface may be displaceable so as to cause variation in the volume of the third reservoir.

The transfer means may comprise a closed fluid system between the first interface and the second interface.

The closed circuit may comprise a non-return valve between the second reservoir and the vaporization portion This non-return valve may be configured to enable the first liquid to flow into the vaporization portion from the second reservoir when gas is displaced from the first reservoir instead of the first liquid.

The vaporization portion may be configured to enable an amount of the first liquid from the second reservoir to flow therethrough to provide cooling to cause condensation of first liquid vapor in the closed circuit.

In some, but not necessarily all, examples there is provided at least one valve is configured to enable gas to be introduced into and/or removed from the closed circuit to thereby enable generation of a pressure which causes the first liquid to displace the first interface.

The closed circuit may comprise one or more non-return valves between the first reservoir and the second reservoir These one or more non-return valves may be configured to prevent the first liquid from circulating around the closed circuit in more than one direction.

In some, but not necessarily all, examples there is provided first liquid having a specific latent heat of evaporation below that of water.

In some, but not necessarily all, examples there is provided a pumping vessel comprising the third reservoir comprising an outlet for coupling to a discharge system and an inlet, wherein the inlet and outlet may both comprise non-return valves.

According to various, but not necessarily all, embodiments there is provided a heat-driven pumping system. The heat-driven pumping system comprises a closed circuit for a first liquid. The closed circuit comprises a vaporization portion. The vaporization portion is configured to receive heat from an external source. The vaporization portion is configured to cause vaporization of first liquid within the vaporization portion. Vaporization of first liquid within the vaporization portion thereby increases an amount of gas in the closed circuit. The closed circuit is sealed such that the increase in the amount of gas increases a pressure exerted on the first liquid, the pressure on the first liquid being transferable, as a pumping force, to cause pumping of a second liquid.

The pressure on the first liquid may be transferable, as a pumping force, to a pumping vessel to cause the pumping of the second liquid.

According to various, but not necessarily all, embodiments there is provided a solar radiation-driven pumping system. The solar radiation-driven pumping system comprises a closed circuit for a first liquid. The closed circuit comprises at least a gas expansion chamber and a reservoir comprising an interface with a closed fluid system. The gas expansion chamber comprises an evaporation screen. The evaporation screen is configured to receive heat derived from solar radiation. The heat causes evaporation of first liquid held by the evaporation screen. Evaporation of first liquid held by the evaporation screen thereby increases an amount of gas in the gas expansion chamber. The closed circuit is sealed such that the increase in the amount of gas in the gas expansion chamber urges the first liquid into the reservoir. The solar radiation-driven pumping system comprises the closed fluid system. The closed fluid system comprises a first fluid-filled bladder and a second fluid-filled bladder, the first and second fluid-filled bladders being fluidly coupled. The first fluid-filled bladder is configured to provide the interface comprised in the reservoir of the closed circuit. The closed fluid system is configured to transfer fluid from the fluid-filled bladder to the second fluid-filled bladder in response to pressure exerted on the first fluid filled bladder, via the interface, by first liquid in the second reservoir. In response to receiving fluid from the first fluid-filled bladder, the second fluid-filled bladder is configured to exert a pumping force on a second liquid comprised in a pumping vessel.

BRIEF DESCRIPTION

Some example embodiments will now be described with reference to the accompanying drawings in which.

DETAILED DESCRIPTION

Figure 1:
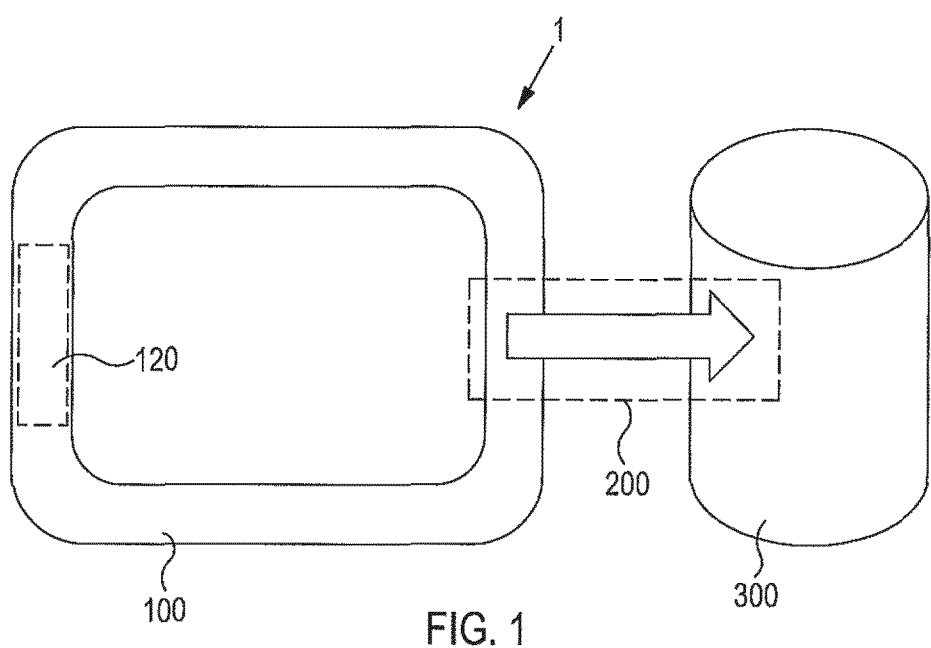
FIG. 1 shows a schematic example of the heat-driven pumping system described herein.
Figure 5:
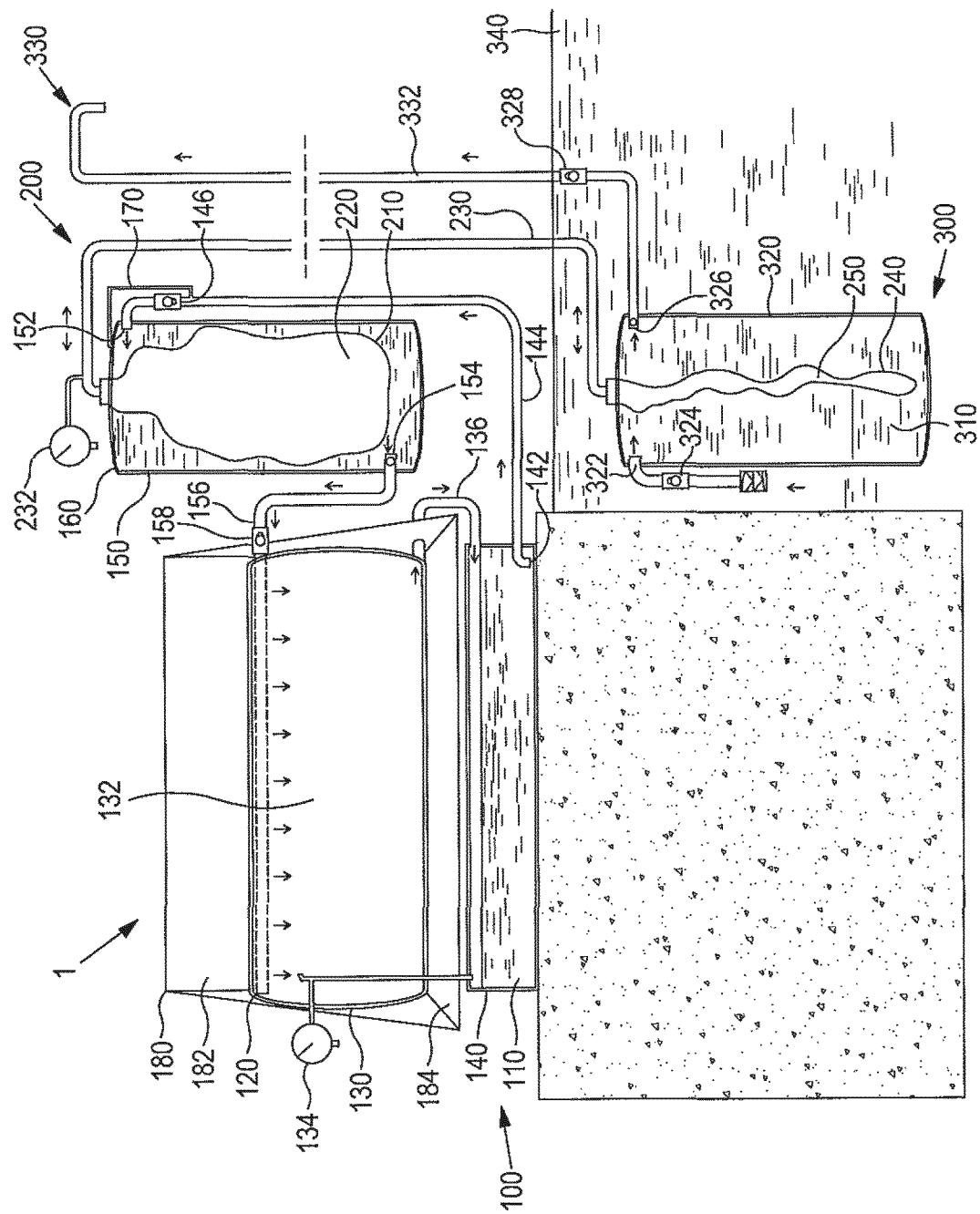
FIG. 5 shows an example of the heat-driven pumping system at a phase of the pumping cycle as described herein.
Figure 6:
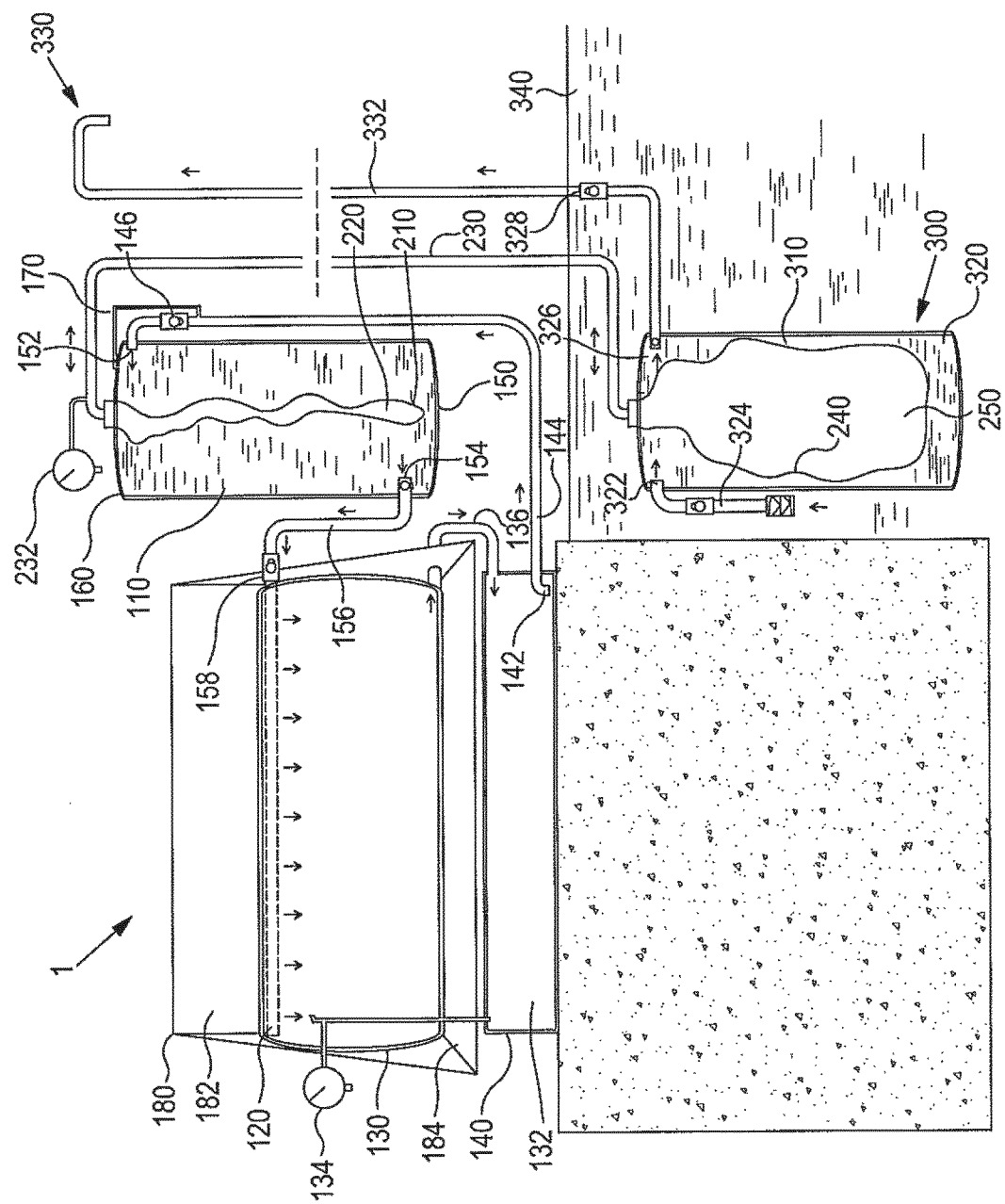
FIG. 6 shows an example of the heat-driven pumping system at another phase of the pumping cycle as described herein.

FIG. 1 illustrates schematically a heat-driven pumping system 1 according to the present disclosure. The heat-driven pumping system 1 comprises a closed circuit 100 for a first liquid 110 (as depicted in FIGS. 5 and 6) and a transfer means 200 for transferring a pumping force to a second liquid 310 (as depicted in FIGS. 5 and 6).

The closed circuit 100 comprises a vaporization portion 120. The vaporization portion 120 of the closed circuit 100 is configured to receive heat from an external source (not shown) and to cause vaporization of first liquid 110 within the vaporization portion 120. Vaporization of first liquid 110 within the vaporization portion 120 causes an increase in an amount of gas 132 within the closed circuit 100. Because the closed circuit 100 is sealed, an increase in the amount of gas 132 within the closed circuit 100 increases an amount of pressure exerted on the first liquid 110 within the closed circuit 100.

In some examples the heat from the external source comprises solar radiation. In other examples the heat from the external source additionally or alternatively comprises heat which has been generated by other means such as an engineering thermal blanket or direct fuel sources such as electricity or biogas.

In some, but not necessarily all, examples the first liquid 110 can be water. Alternatively, the first liquid 110 can be a liquid which has a specific latent heat of evaporation below that of water. For example, water has a specific latent heat of evaporation of 2264.705 kJ/kg whereas an example of an alternative first liquid 110 such as ethanol has a specific latent heat of evaporation of approximately 850 kJ/kg and another example of an alternative first liquid 110 such as methanol has a specific latent heat of evaporation of approximately 1100 kJ/kg. The first liquid 110 can be, in some examples, a liquid having a specific latent heat of evaporation which is less than 2000 kJ/kg. By using a liquid which has a lower specific latent heat of evaporation than water, the efficiency of vaporization can be improved. For example, lower energy input is required in order to cause vaporization. In some examples the first liquid 110 is selected so as not to leave residue upon vaporization. For example, the first liquid 110 is not a suspension or a colloidal suspension.

Not all of the first liquid 110 within the closed circuit 100 can be within the vaporization portion 120 at any one time therefore not all of the first liquid 110 within the closed circuit 100 is vaporized at any one time. In some examples, the vaporization portion 120 is configured to enable liquid, for example the first liquid 110, to flow therethrough, retaining an amount of the liquid and enabling other liquid to pass to other portions of the closed circuit 100. The vaporization portion may comprise a barrier to other portions of the closed circuit 100 which become permeable or increasingly permeable when saturated by a liquid such as, for example, the first liquid 110.

There exists an amount of gas 132 in the closed circuit 100 even without vaporization of the first liquid 110. In some examples this gas 132 can be air. In other examples this gas 132 can comprise another gas. The gas 132 which exists within the closed circuit 100, in addition to first liquid vapor, may be selected to have a greater molecular mass than the first liquid 110. Therefore, the gas 132 in such examples tends to sink below the first liquid vapor. In this manner the gas 132 forms a layer between the first liquid vapor and the first liquid 110, keeping them substantially separate. This reduces condensation of the first liquid vapor and therefore enables pressure on the first liquid 110 to be maintained. It should also be appreciated that even where the molecular mass is not less than that of the first liquid 110, the heat of the first liquid vapor tends to cause the first liquid vapor to remain on top of the gas 132. For example, if the first liquid 110 comprises water and the gas 132 comprises air, the water vapor tends to sit above the air. The gas 132 can also comprised compressed air. Compressed air holds less water vapor than air and so would provide improved separation between the water vapor and the water below the compressed air. In some examples the gas 132 is also selected to have a lower compressibility than air. This provides the advantage that the gas 132 will be more efficient at exerting pressure on the first liquid 110 than air.

While the closed circuit 100 is described as being sealed, in some examples it is possible for the closed circuit 110 to be unsealed in order to replace the first liquid 110 or to increase or decrease the amount of gas 132 within the closed circuit 100. The closed circuit 100 may therefore comprise one or more valves 134 for such purposes.

The transfer means 200 enables a transfer of pressure which is exerted on the first liquid 110 in the closed circuit 100 into pressure which is exerted on a second liquid 310. In some examples the transfer means 200 converts pressure exerted on the first liquid 110 into compression of a reservoir for the second liquid 310 (see, for example, the third reservoir 320 in FIG. 2). Compression of this reservoir causes displacement of the second liquid 310 within said reservoir into a discharge system (see, for example, the discharge system 330 in FIG. 2) which is coupled to that reservoir. It is understood that in this instance the discharge system is fluidly coupled to the reservoir. In some examples the transfer means 200 is configured to convert the pressure exerted on the first liquid 110 into a pumping force which is transferred to a pumping vessel 300 for pumping the second liquid 310.

Because the closed circuit 100 is sealed from atmospheric pressure the heat-driven pumping system 1 as shown in FIG. 1 can operate with a positive pressure as compared to atmospheric pressure. In comparison to pumping systems which are not sealed against atmospheric pressure, and which therefore operate using negative pressure, the components of the system 1, for example the closed circuit 100, can be formed of thinner and lower weight materials. The heat-driven pumping system 1 as shown in FIG. 1 is therefore more readily transportable and has smaller packaging size than existing pumping systems.

By running the heat-driven pumping system 1 with a positive pressure as compared to atmospheric pressure rather than a negative pressure as compared to atmospheric pressure, a better flow rate of the second liquid 310 can be achieved. Stronger pumping may be provided by greater pressure gradients.

Since the first liquid 110 is circulated about a closed circuit 100, the first liquid 110 and the second liquid 310 remain separate. As a result, a more efficient liquid for driving pumping of the second liquid 310 may be used as the first liquid 110. Furthermore, a second liquid 310 which is contaminated can be pumped without adversely affecting the driving mechanism of the heat-driven pumping system 1 which is provided by the closed circuit 100. The heat-driven pumping system 1 as shown in FIG. 1 is therefore more readily reusable and can be reused with many different liquids, some of which may be contaminated and some of which may be required to avoid contamination. The heat-driven pumping system 1 can be used with gritty liquids which cause wear of the components of the system and with suspensions which may cause a build-up of sediment within the system without any adverse effects to the closed circuit 100 of the system. Therefore, the closed circuit 100 which drives the pumping is not prevented from working and is able to maintain maximum efficiency. Wear on components of the closed circuit 100 would adversely affect liquid retention within the closed circuit 100 and the build-up of sediments in the closed circuit 100 could insulate against or reflect heat from the external source and therefore reduce the heat within the vaporization portion and thus efficiency of the vaporization within the closed circuit 100. These issues are ameliorated by the separation of the first liquid 110 from the second liquid 310 by means of using the closed circuit 100.

Figure 2:
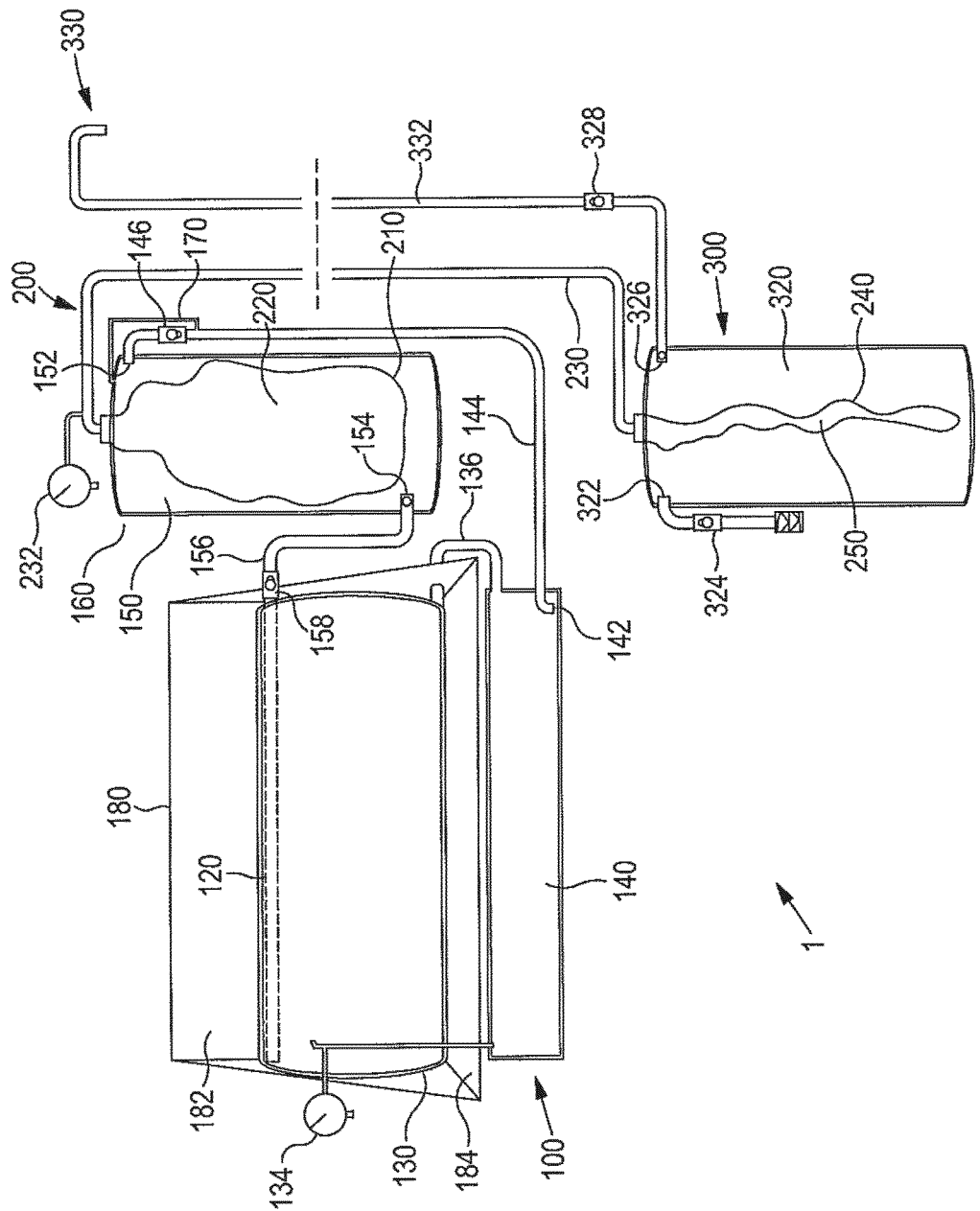
FIG. 2 shows another example of the heat-driven pumping system described herein.

FIG. 2 illustrates an example of the heat-driven pumping system 1 according to the present disclosure. In the example of FIG. 2 it can be seen that the vaporization portion 120 of the closed circuit 100 is a portion of the closed circuit 100 which is configured to receive heat from an external source. The vaporization portion 120 can be a portion upon which heat is to be focused. The housing of the closed circuit 100 at the vaporization portion 120 is thermally conductive so that heat incident on the housing is transmitted to first liquid 110 within the vaporization portion 120.

In the example of FIG. 2 the vaporization portion 120 is a part of an expansion chamber 130. The expansion chamber 130 is a portion of the closed circuit 100 in which gas 132 and first liquid vapor are expanded due to heat received from the external source. The valve 134 enables gas 132 to be introduced into the expansion chamber 130 or to be removed from the expansion chamber 130 in order to adjust the amount of gas 132 in the closed circuit 100.

In the example of FIG. 2 the expansion chamber 130 is separate to a first reservoir 140 for first liquid 110 and is connected to the first reservoir 140 via a tube 136, however it is to be appreciated that the expansion chamber 130 may comprise the first reservoir 140 for the first liquid 110 or the expansion chamber 130 and the first liquid 110 may be comprised within a common chamber with a divider between the two. In some examples such a divider may be a baffle floating on top of the first liquid 110. By providing a separate chamber for the first reservoir 140 as in the example of FIG. 2 there is less heating of the first liquid 110.

Figure 3:
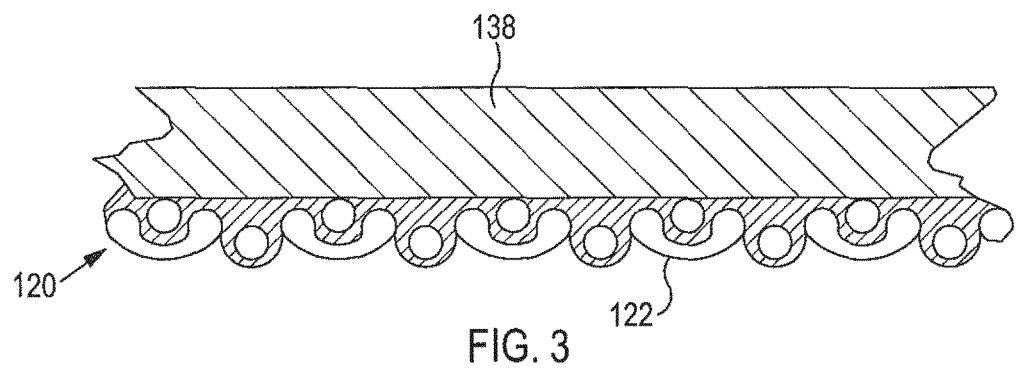
FIG. 3 shows a schematic example of a vaporization portion as described herein.

The vaporization portion 120 may in some examples comprise an evaporation screen 122. The evaporation screen 122 is described in more detail in relation to FIG. 3. FIG. 3 schematically illustrates an example of an evaporation screen 122. In some examples the evaporation screen 122 is a narrow gauge woven or fibrous material such as, for example, fiberglass. In some examples the weave would allow incoming liquid to run through the material and allow retention of some of the liquid in the weave to create a large surface area at an interface between the liquid and gas 132 within the vaporization portion 120.

In some examples the evaporation screen 122 is bonded to a wall 138 of the expansion chamber 130. In some examples the wall 138 functions as a solar collector. For example, the wall 138 of the expansion chamber 130 may have a pigmentation known to absorb solar radiation if made from synthetic plastic materials. In some examples the wall 138 of the expansion chamber 130 could also be made of a narrow gauge steel or aluminum which is coated on its outer surface with a material known to absorb solar radiation and convert it to heat. The gauge could be between 0.25 mm and 1.5 mm.

In some examples, as an alternative to the evaporation screen 122, the vaporization portion 120 may comprise means for providing a fine spray of first liquid 110 droplets onto a heated plate, the plate being heated directly or indirectly by heat from the external source. Other means suitable for enabling evaporation in an efficient manner, for example quickly and with minimal heat input, can be used instead of the evaporation screen 122. In some examples the vaporization portion 120 is maintained at a high pressure because high pressure increases the rate of evaporation. This high pressure may be provided by introducing more gas 132 into the closed circuit 100 using the valve.

In alternative examples the expansion chamber 130 may be replaced by an evacuated tube. In some examples, for example where there is relatively low pressure within the evacuated tube, an evaporation screen 122 can be bonded directly to an inner surface of the evacuated tube. In other examples, for example where there is relatively high pressure within the evacuated tube, the evaporation screen 122 can be sealed in a pressure vessel that is fitted into the evacuated tube.

Returning to the example of FIG. 2, the expansion chamber 130 is enclosed or substantially enclosed by an outer casing 180. The outer casing 180 may be configured as optics to focus solar radiation onto the expansion chamber 130 or specifically onto the vaporization portion 120 of the expansion chamber 130. For example, the outer casing 180 can comprise back and base walls 182, 184 which are flat and lined with a reflective material. The expansion chamber 130 can be positioned within the outer casing 180 so that solar radiation is reflected onto a portion of the wall 138 of the expansion chamber 130 which does not receive direct solar radiation. A front wall (not shown for clarity) of the outer casing 180 can be made of transparent plastic or glass. The front wall of the outer casing 180 may comprise a lens configured to concentrate solar radiation onto the expansion chamber 130 or specifically onto the vaporization portion 120 so as to increase the temperature and thus the pressure within the closed circuit 100. In some examples the back and base walls 182, 184 of the outer casing 180 may be configured as a large parabolic reflector.

Some of the walls of the outer casing 180 may be lined with moisture-resistant low density thermal insulation such as expanded polystyrene. This ameliorates heat loss and also heat retention within the walls of the outer casing 180. Specifically heat loss is ameliorated during a time when vaporization of first liquid 110 within the vaporization portion 120 occurs and during a time when expansion of the gas 132 within the expansion chamber 130 occurs. Heat loss is ameliorated during a pumping phase 4 of the pumping cycle 2 (see FIG. 4). Heat retention is ameliorated during a time when the first liquid 110 vapor condenses. Heat loss is ameliorated during a re-set phase 6 of the pumping cycle 2 (see FIG. 4).

In the example of FIG. 2, the closed circuit 100 also comprises a first reservoir 140 for the first liquid 110. The first reservoir 140 comprises an outlet 142 arranged at a low level within the first reservoir 140 such that at least substantially all (and in some examples, all) liquid within the first reservoir 140 can be displaced from the first reservoir 140 into the outlet 142.

A tube 144 connects the outlet 142 of the first reservoir 140 with an inlet 152 of the second reservoir 150. In some examples the tube 144 is arranged so that liquid moving from the first reservoir 140 to the second reservoir 150 does so against gravity. This prevents liquid from moving from the first reservoir 140 to the second reservoir 150 when there is no or insufficient heat received from the external source. In some examples the tube 144 comprises a non-return valve 146 (otherwise known as a check valve). The non-return valve 146 is configured to prevent the first liquid 110 from circulating around the closed circuit 100 in more than one direction. The non-return valve 146 allows the flow of fluid from the first reservoir 140 to the second reservoir 150 but not from the second reservoir 150 to the first reservoir 140 along the interconnecting tube 144.

In the example of FIG. 2, the second reservoir 150 for first liquid 110 displaced from the first reservoir 140 is formed by a chamber within a vessel 160. The second reservoir 150 comprises an inlet through which liquid displaced from the first reservoir 140 can enter. The second reservoir 150 comprises an outlet 154 which is connected by a tube 156 to the vaporization portion 120. This tube 156 also comprises a non-return valve 158 which allows the flow of fluid from the second reservoir 150 to the vaporization portion 120 but not from the vaporization portion 120 to the second reservoir 150 along this tube 156.

In some examples gas return tube 170 enables the flow of gas 132 from out of the second reservoir 150 and back into the tube 144 interconnecting the first and second reservoirs 140, 150 at a position between the first reservoir 140 and the non-return valve 146. The gas return tube 170 performs the function of reducing an amount of gas 132 which may accumulate over successive pumping cycles in the second reservoir 150. The gas return tube 170 may be replaced by any suitable means for reducing the accumulation of gas 132 in the second reservoir 150. For example, the gas return tube 170 and non-return valve 146 can be exchanged for a limiting return valve (not shown) comprised in the tube 144. The limiting return valve can be selected to enable substantially 100% flow in a direction from the first reservoir 140 to the second reservoir 150 and substantially 10 to 20% flow in the opposing direction. In other examples the non-return valve 146 can be configured to form a liquid-tight seal but not a gas-tight seal when closed, thereby allowing some gas 132 to flow out of the second reservoir 150 towards the first reservoir 140 via the non-return valve 146. The non-return valve 146 could comprise a semipermeable component which enables the passage of gas in both directions but liquid in only one.

The second reservoir 150 comprises a first interface 210 with a first compressible chamber 220. The first interface 210 is displaceable so as to cause compression of the first compressible chamber 220 under pressure exerted by the first liquid 110 in the second reservoir 150. In the example shown in FIG. 2, the first interface 210 is provided by a first membrane. The first membrane forms an outer wall of a first fluid-filled bladder which provides the first compressible chamber 220. The first fluid-filled bladder is connected to a second fluid-filled bladder by a tube 230. The second fluid-filled bladder is not comprised in the same vessel as the first fluid-filled bladder in the example of FIG. 2. The two fluid-filled bladders and the interconnecting tube 230 form a closed fluid system. In some examples a valve 232 may be provided which enables an amount of fluid within this closed fluid system to be adjusted, for example to be increased or to be decreased.

In the example of FIG. 2 the second fluid-filled bladder is comprised within the pumping vessel 300. The pumping vessel 300 comprises a third reservoir 320 for second liquid 310. The third reservoir 320 comprises an outlet 326 for coupling the third reservoir 320 to a discharge system 330. The third reservoir 320 also comprises an inlet 322. In some examples the pumping vessel 300 is submerged in the source 340 of the second liquid 310. This is depicted in FIGS. 5 and 6. The inlet 322 and the outlet 326 both comprise non-return valves 324, 328. The discharge system 330 comprises a tube 332 which enables the second liquid 310 to be pumped from a source 340 to a higher level.

The third reservoir 320 comprises a second interface 240 with a second compressible chamber 250. The second compressible chamber 250 is provided by the second fluid-filled bladder. The second interface 240 is displaceable so as to cause variation in the volume of the third reservoir 320. The second interface 240 is provided by a second membrane which forms the outer wall of the second fluid-filled bladder.

The transfer means 200 comprises the first and the second interfaces 220, 240 and the closed fluid system between the first interface 210 and the second interface 240. In the specific example of FIG. 2, the transfer means 200 comprises the two fluid-filled bladders and the interconnecting tube 230. In other examples, the transfer means 200 may be configured as a reciprocating-type positive displacement pump. For example, the transfer means 200 may comprise a piston, a plunger, or a diaphragm. In some examples the first interface 210 with the second reservoir 150 is provided by a first piston. In some examples the second interface 240 is provided by a second piston. The first piston could be integral with the second piston or the first and second pistons may be connected by some other mechanical means such as one or more connecting rods and/or one or more gears. Alternatively, the first and second piston could be connected by a pneumatic or hydraulic connection which provides a closed fluid system. In still other examples, the second and third reservoirs 150, 320 could be comprised in a single vessel whereby the transfer means 200 comprises a displaceable dividing wall between the two reservoirs 150, 320. In some such examples the third reservoir 320 may be provided within a bladder comprised in the second reservoir 150.

Although not shown in FIG. 2 the closed circuit 100 may be provided at various points with cooling fins to dissipate heat which could otherwise be retained in the closed circuit 100. Additionally or alternatively, some of the pumped second liquid 310 could be used to cool the closed circuit 100. For example, the pumped second liquid 310 could be used in a heat exchanger.

Figure 4:
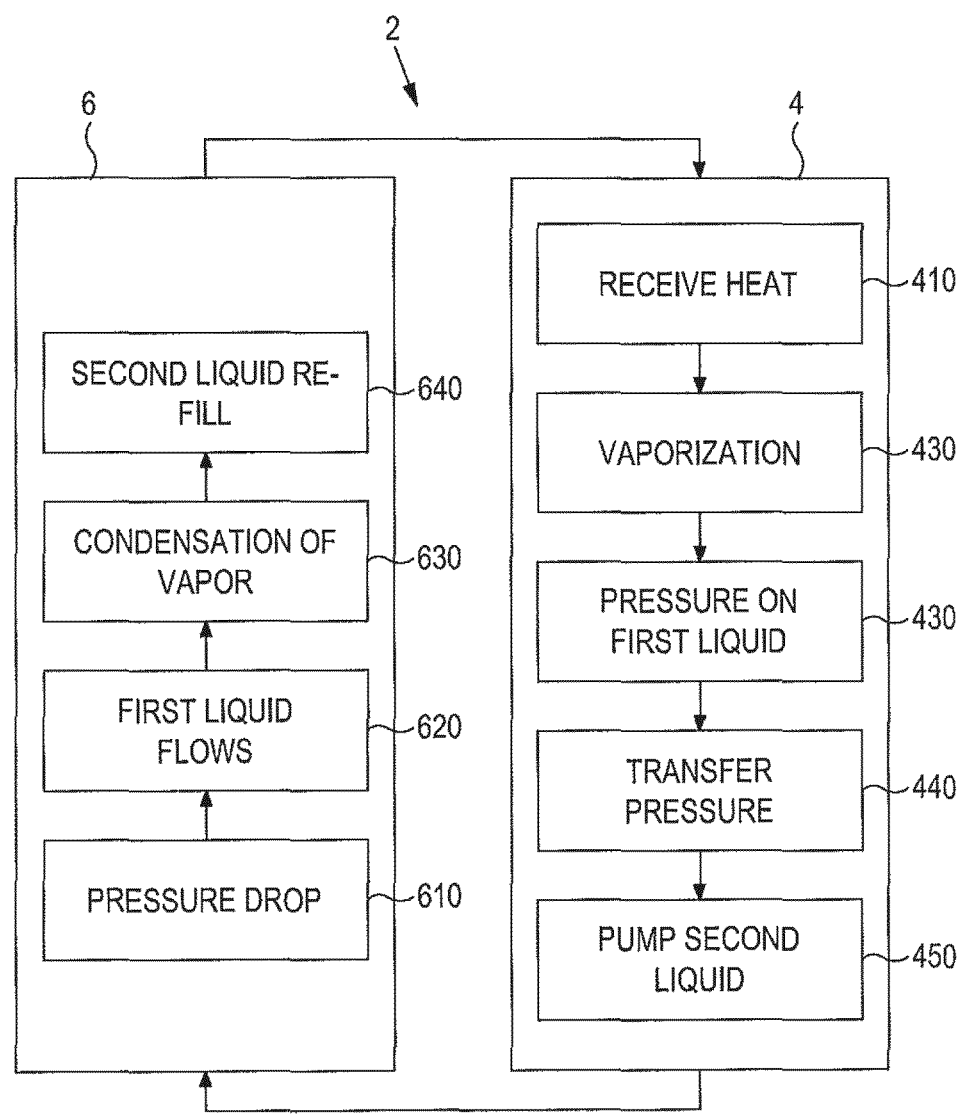
FIG. 4 shows an example of a pumping cycle as described herein.

The operation of the heat-driven pumping system 1 is cyclic in nature. In some examples the pumping cycle 2 has distinct phases comprising at least a pumping phase 4 and a re-set phase 6. FIG. 4 illustrates a flow diagram of the pumping cycle. The pumping cycle is described with reference to FIG. 5 which shows a configuration of the heat-driven pumping system 1 at a start of the pumping phase 4 (and an end of the re-set phase 6) and FIG. 6 which shows a configuration of the heat-driven pumping system 1 an end of the pumping phase 4 (and a start of the re-set phase 6). The terms start and end with reference to the cycle 2 are used arbitrarily.

At the start of the cycle 2 a small amount of first liquid 110 is comprised in the vaporization portion 120 of the closed circuit 100. The first reservoir 140 contains a larger body of first liquid 110. In some examples the first reservoir 140 contains all of the first liquid 110 other than that in the vaporization portion 120.

As per block 410 in FIG. 4, heat from the external source is received by the vaporization portion 120. The heat which is received causes vaporization of first liquid 110 within the vaporization portion 120 as per block 420 in FIG. 4. Vaporization causes an increase in the amount of gas 132 in the closed circuit 100. In some examples this increases the amount of gas 132 in the expansion chamber 130. Since this gas 132 cannot expand past the non-return valve 158 towards the second reservoir 150 in one direction (e.g., clockwise in the closed circuit 100 depicted in FIGS. 6 and 6) and cannot expand past the first liquid 110 in the first reservoir 140 in the other direction (e.g., anticlockwise in the closed circuit 100 depicted in FIGS. 6 and 6), the gas 132 presses on the first liquid 110 and causes an increase in the pressure exerted on the first liquid 110 as per block 430 in FIG. 4. Since, relative to gases, liquids are substantially incompressible, the first liquid 110 is therefore urged through the outlet 142 of the first reservoir 140 into the tube 144 which connects the first reservoir 140 with the second reservoir 150 under the pressure exerted by the expanding gas 132. The first liquid 110 is therefore displaced from the first reservoir 140, past the non-return valve 146 and into the second reservoir 150.

The volume of the closed circuit 100 is not fixed. The closed circuit 100 has an expandable volume. The closed circuit 100 is configured to cause its volume to expand when pressure exerted on the first liquid 110 by gas 132 in the closed circuit 100 increases. In some examples the external volume of the closed circuit 100 is fixed but the internal volume can be expanded. As first liquid 110 enters the second reservoir 150 it comes into contact with the first interface 210 and begins to exert pressure on the first interface 210. The first interface 210 is displaced under the pressure exerted by the first liquid 110 and this in turn causes compression of the first compressible chamber 220 provided, in the example of FIGS. 5 and 6, by the first fluid-filled bladder. This causes expansion of the volume of the second reservoir 150 and the closed circuit 100 as a whole.

The transfer means 200 transfers pressure from the first liquid 110 to the second liquid 310 as per block 440 in FIG. 4. In some examples the transfer means 200 provides a fixed relationship between a volume of the pumping vessel 300 and a volume of the closed circuit 100. In some examples the transfer means 200 is configured to cause the volume of the pumping vessel 300 and the volume of the closed circuit 100 to vary in antiphase. For example, when the volume of the pumping vessel 300 is at a minimum, the volume of the closed circuit 100 is at a maximum and when the volume of the pumping vessel 300 is at a maximum, the volume of the closed circuit 100 is at a minimum.

In the examples as shown in FIGS. 5 and 6 the first fluid-filled bladder, providing the first compressible chamber 220, is compressed by the first liquid 110 displaced into the second reservoir 150. Fluid in the first fluid-filled bladder is therefore displaced into the second fluid-filled bladder, providing the second compressible chamber 250. Since the two fluid-filled bladders are part of a closed fluid system, a decrease in the volume of one will cause a corresponding increase in the volume of the other. Therefore, as the second bladder expands, the volume of the third reservoir 320 is reduced. As such, the transfer means 200 provides a fixed relationship between the volume of the third reservoir 320 in the pumping vessel 300 and the volume of the second reservoir 150 in the closed circuit 100. The transfer means 200 causes the volume of the third reservoir 320 in the pumping vessel 300 and the volume of the second reservoir 150 in the closed circuit 100 to vary in antiphase. It is noted that the relationship between the volume of the third reservoir 320 and the volume of the second reservoir 150 may not be linear if the fluid comprised in the closed fluid system between the two interfaces 210, 240 is compressible.

Reducing the volume of the pumping vessel 300, for example by reducing the volume of the third reservoir 320, causes the second liquid to be pumped as per block 450 in FIG. 4. Upon reducing the volume of the third reservoir 320, second liquid 310 contained within the third reservoir 320 is urged into the discharge system 330 via the outlet 326 of the third reservoir 320. The second liquid 310 is urged past the non-return valve 328 and thus cannot flow back out of the discharge system 330 into the third reservoir 320. The second liquid 310 cannot flow out of the third reservoir 320 back into the source 340 of the second liquid 310 because of the non-return valve 324 provided in the inlet 322 to the third reservoir 320. Over time the head of the second liquid 310 within the discharge system 330 is increased in height until it reaches the top of a discharge tube 332.

In some examples by adjusting the fixed relationship between the volume of the pumping vessel 300 and the volume of the closed circuit 100, a position of the head of the second liquid 310 in the discharge system 330 can be preset such that it is close to the top of the discharge tube before the pumping phase 4 begins. As a result, the urging of second liquid 310 into the discharge system 330 causes the second liquid 310 to reach the top of the discharge tube in less time. By matching the pressure exerted on the second liquid 310 by the second interface 240 when the third reservoir 320 has its maximum volume to the pressure arising from the depth of the second liquid 310 in the discharge tube, the height to which the second liquid 310 may be raised by the heat-driven pumping system 1 is increased. The second liquid 310 can therefore be pumped over a greater height.

In the examples of FIGS. 5 and 6, the valve 232 enables fluid to be introduced to the closed fluid system between the first and second interfaces 210, 240 comprised in the transfer means 200. By adding more fluid to this closed fluid system the pressure exerted on the second liquid 310 by the second interface 240 is increased, enabling greater pressure due to a greater depth of the second liquid 310 in the discharge system 330 to be overcome.

In some examples, when introducing fluid into the closed fluid system between the two interfaces 210, 240 comprised in the transfer means 200, the pressure in the closed circuit 100 should also be increased to enable compression of the first compressible chamber 220 within the second reservoir 150. The valve 134 comprised in the expansion chamber 130 enables additional gas to be introduced into the closed circuit 100 so that when vaporization of first liquid 110 within the vaporization portion 120 occurs, the first liquid 110 which is not vaporized can be displaced into the second reservoir 150, overcoming the pressure within the first compressible chamber 220.

While the first liquid 110 is being displaced from the first reservoir 140, the pressure in the vaporization portion 120 is sufficient to hold the non-return valve 158 (which is disposed between the vaporization portion 120 and the second reservoir 150) closed. Once the level of the first liquid 110 in the first reservoir 140 has dropped below the level of the outlet 142 from the first reservoir 140, the gas 132 in the closed circuit 100 expands into the tube 144 via the outlet 142 from the first reservoir 140 and towards the second reservoir 150. The pressure in the vaporization portion 120 therefore begins to drop as per block 610 in FIG. 4. The pressure holding the non-return valve 158 closed therefore decreases to the point at which the non-return valve 158 opens. For examples, the pressure within the vaporization portion 120 and the second reservoir 150 may be equalized and the first liquid 110, under the influence of gravity, urges the non-return valve 158 open. A first liquid 110 then flows from the first second reservoir 150 into the vaporization portion 120 as per block 620 in FIG. 4. For example, the first liquid 110 may flow from the first second reservoir 150 into the vaporization portion 120 via the tube 156 under the influence of gravity.

In some examples, gravity may not be the primary driver for urging the non-return valve 158 open or for the flow of the first liquid 110 from the from the first second reservoir 150 into the vaporization portion 120. Pressure exerted by the first interface 210 on the first liquid 110 may be primarily responsible for this. This pressure may result from the nature of the interface 210 itself. For example, the first interface 210 may be an elastic material which is stretched during the pumping phase 4, storing elastic energy which is released during the re-set phase 6 to urge the first liquid 110 back into the vaporization portion. Additionally or alternatively, this pressure may result from an increase in the amount of fluid within the first compressible chamber 220 or an expansion of said fluid.

In some, but not necessarily all, examples, when the gas 132 in the closed circuit 100 expands into the second reservoir 150 via the tube 144, it is able to subsequently escape the reservoir 150 via the gas return tube 170 or other suitable means. This reduces the accumulation of gas 132 in the second reservoir 150 over successive pumping cycles 2. An accumulation of gas 132 in the second reservoir 150 could cause an increased resistance to the flow of first liquid 110 from the first reservoir 140 towards the second reservoir 150. By reducing such accumulation, this issue is ameliorated and the efficiency of the heat-driven pumping system 1 is maintained over successive pumping cycles 2.

When the first liquid 110 flows from the first second reservoir 150 into the vaporization portion 120 as per block 620 in FIG. 4, some first liquid 110 is held in the vaporization portion 120 and the rest flows into the first reservoir 140, refilling it.

In some examples as the first liquid 110 flows through the vaporization portion 120 and, in some examples, the expansion chamber 130, it provides cooling to cause condensation of first liquid vapor in the closed circuit 100 as per block 630 in FIG. 4. The flow of this first liquid 110 effectively isolates the interior of the vaporization portion 120 and expansion chamber 130 from heat received from the external source, causing a drop in temperature and pressure inside the expansion chamber 130. This drop in temperature and pressure causes most of the first liquid vapor to condense and to then flow into the first reservoir 140.

As the first liquid 110 exits the second reservoir 150, flowing back into the vaporization portion 120, there is a decrease in the pressure exerted by the first liquid 110 on the first compressible chamber 220 (provided, in the examples of FIGS. 5 and 6, by the first fluid-filled bladder). The pressure exerted by the second liquid 310 on the second compressible chamber 250 (provided, in the examples of FIGS. 5 and 6, by the second fluid-filled bladder) therefore becomes greater than the pressure on the first compressible chamber 220 due to the first liquid 110. Fluid is therefore urged out of the second compressible chamber 250 and is displaced into the first compressible chamber 220. The first compressible chamber 220 therefore expands as the second compressible chamber 250 is compressed. In some examples the expansion of the first compressible chamber 220 urges the first liquid 110 out of the second reservoir 150 at a faster rate.

As the second compressible chamber 250 is compressed, more second liquid 310 can enter the third reservoir 320 via the inlet to fill its expanding volume as per block 640 in FIG. 4. This second liquid 310 is prevented from flowing back out into the source 340 of the second liquid 310 through the inlet 322 by the non-return valve 324. The second liquid 310 in the third reservoir 320 can only exit the third reservoir 320 via the discharge system 330.

At this point the cycle 2 has returned to the start.

The above described examples of the heat-driven pumping system 1 find application as enabling components of a purifier (not shown) for the second liquid 310.

The purifier may comprise a pasteurizer which is arranged to take an input from the discharge system 330 and which is has an outlet at a higher level than its inlet so that output from the pasteurizer is only provided when there is sufficient pumping force generated by the heat-driven pumping system to raise the second liquid 310 by the height difference between the pasteurizers inlet and outlet.

As described in the foregoing, the heat-driven pumping system 1 pumps the second liquid 310 when sufficient heat is received to generate sufficient pressure within the closed circuit 100 to cause the transfer means 200 to transfer a pumping force to the pumping vessel 300 for the second liquid 310. Therefore, with appropriate tuning of the heat-driven pumping system 1, sufficient pumping force for raising the second liquid 310 by the height difference between the pasteurizers inlet and outlet is provided only once there is sufficient heat from an external source for causing a pasteurizer (not shown) to properly pasteurize the second liquid 310.

Tuning of the heat-driven pumping system 1 may be by selection of dimensions within the closed circuit 100 or by selection of the composition or amount of the first liquid 110, gas 132, and/or fluid used in the transfer means 200.

As described in the foregoing, the second liquid 310 is displaced by the precise accumulation of pressure in carefully controlled chambers of the closed circuit 100, eliminating the need for electrical sensors or electrically controlled actuators. This provides improved efficiency, while substantially lowering production and operational costs.

Where a structural feature has been described, it may be replaced by means for performing one or more of the functions of the structural feature whether that function or those functions are explicitly or implicitly described.

The terms "coupled" and "connected" are used in this document to mean, unless otherwise stated, operationally coupled and any number or combination of intervening elements can exist (including no intervening elements).

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one" or by using "consisting".

In this description, reference has been made to various examples. The description of features or functions in relation to an example indicates that those features or functions are present in that example. The use of the term "example" or "for example" or "can" or "may" in the text denotes, whether explicitly stated or not, that such features or functions are present in at least the described example, whether described as an example or not, and that they can be, but are not necessarily, present in some of or all other examples. Thus "example", "for example", "can" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term "a" or "the" is used in this document with an inclusive not an exclusive meaning. That is any reference to X comprising a/the Y indicates that X may comprise only one Y or may comprise more than one Y unless the context clearly indicates the contrary. If it is intended to use "a" or "the" with an exclusive meaning then it will be made clear in the context. In some circumstances the use of "at least one" or "one or more" may be used to emphasis an inclusive meaning but the absence of these terms should not be taken to infer and exclusive meaning.

The presence of a feature (or combination of features) in a claim is a reference to that feature) or combination of features itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. A heat-driven pumping system comprising:
a closed circuit for a first liquid, the closed circuit comprising the following elements arranged in the following order; i) a vaporization portion, ii) a first reservoir, and iii) a second reservoir, the vaporization portion being configured to receive heat from an external source and to cause vaporization of at least some first liquid within the vaporization portion to thereby increase an amount of gas in the closed circuit, wherein the closed circuit is sealed such that the increase in the amount of gas increases a pressure exerted on the first liquid, the first reservoir being arranged below the vaporization portion and below the second reservoir, the second reservoir having has an expandable volume by means of a first displaceable interface with a closed fluid system, the second reservoir being connected to the vaporisation portion by a non-return valve such that the first liquid can flow from the second reservoir to the vaporisation portion but can only flow from the vaporisation portion to the second reservoir via the first reservoir;

a transfer means comprising the closed fluid system, the closed fluid system having a second displaceable interface with a third reservoir within a pumping vessel, the closed fluid system being configured so that displacement of the first displaceable interface causes a corresponding displacement of the second displaceable interface to convert the pressure exerted on the first liquid into a pumping force which is transferred to the pumping vessel for pumping a second liquid; and a valve enabling introduction of additional gas into the closed circuit and a valve enabling introduction of additional fluid into the closed fluid system so as to enable pre-setting of a position of a head of the second liquid in a discharge system coupled to the pumping vessel.

2. The pumping system as claimed in claim 1 wherein the transfer means is configured to cause the volume of the pumping vessel and the volume of the closed circuit to vary in antiphase.

3. The pumping system as claimed in claim 1 wherein the vaporization portion is configured to enable an amount of the first liquid from the second reservoir to flow therethrough.

4. The pumping system as claimed in claim 1 wherein the closed circuit comprises one or more further non-return valves between the first reservoir and the second reservoir, the one or more further non-return valves configured to prevent the first liquid from circulating around the closed circuit in more than one direction such that the first liquid can only flow from the second reservoir to the first reservoir via the vaporisation portion.

5. The pumping system as claimed in claim 1 comprising the first liquid having a specific latent heat of evaporation below that of water.

6. The pumping system as claimed in claim 1 comprising the pumping vessel, wherein the third reservoir comprises an outlet for coupling to a discharge system and an inlet, and wherein the inlet and outlet both comprise non-return valves.

7. A method of pumping a second liquid comprising:
providing a sealed closed circuit for a first liquid, the sealed closed circuit comprising the following elements arranged in the following order: i) a vaporization portion, ii) a first reservoir, and iii) a second reservoir, the first reservoir being arranged below the vaporization portion and below the second reservoir, the second reservoir having an expandable volume, the volume of the second reservoir having a fixed relationship with the volume of a pumping vessel for pumping the second liquid, the second reservoir being connected to the vaporisation portion by a non-return valve such that the first liquid can flow from the second reservoir to the vaporisation portion but can only flow from the vaporisation portion to the second reservoir via the first reservoir;

adjusting the fixed relationship between the volume of the pumping vessel and the volume of the second reservoir to pre-set a position of a head of the second liquid in a discharge system coupled to the pumping vessel;

vaporizing first liquid within the vaporization portion, said vaporizing being caused by heat received from an external source at the vaporization portion, said vaporizing increasing an amount of gas in the closed circuit thereby causing the pas to press on the first liquid in the first reservoir and urge it, against gravity, into the second reservoir and into contact with a displaceable interface upon which it exerts pressure;

converting the pressure exerted on the displaceable interface into a pumping force; and transferring the pumping force to a pumping vessel for pumping a second liquid.

8. The pumping system of claim 1, wherein the vaporization portion comprises an evaporation screen.

9. The pumping system of claim 8, wherein the evaporation screen is a narrow gauge woven or fibrous material.

10. The pumping system of claim 8, wherein vaporization portion is a portion of an expansion chamber, and wherein the evaporation screen is bonded to a wall of the expansion chamber.

11. The pumping system of claim 10, wherein the expansion chamber comprises gas which has a greater molecular mass than the first liquid and is therefore displaced from the expansion chamber into the first reservoir arranged below the expansion chamber upon expansion of vaporized first liquid due to the heat received from the external source.

12. The pumping system of claim 10, wherein the wall of the expansion chamber is a solar collector.

13. The pumping system of claim 10, comprising an outer casing which encloses or substantially encloses the expansion chamber, wherein the outer casing is configured as optics to focus solar radiation onto the expansion chamber or specifically onto the vaporization portion of the expansion chamber.

14. The pumping system of claim 1, wherein the closed fluid system comprises a first fluid-filled bladder and a second fluid-filled bladder, the first and second fluid-filled bladders being fluidly coupled, the first fluid-filled bladder being configured to provide the first displaceable interface, the second fluid-filled bladder being configured to provide the second displaceable interface.

15. The pumping system of claim 4, wherein the closed circuit comprises a gas return tube configured to enable the flow of gas from out of the second reservoir back to a position between the first reservoir and the one or more further non-return valves.

* * * * *